United States Patent [19]

Eyrainer et al.

[11] Patent Number: 5,333,903
[45] Date of Patent: Aug. 2, 1994

[54] INFLATABLE GAS BAG FOR RESTRAINING SYSTEMS IN VEHICLES

[75] Inventors: Heinz Eyrainer, Waldstetten; Hans Kissendorfer, Günzburg, both of Fed. Rep. of Germany

[73] Assignee: TRW Repa GmbH, Alfdorf, Fed. Rep. of Germany

[21] Appl. No.: 822,074

[22] Filed: Jan. 17, 1992

[30] Foreign Application Priority Data

Jan. 17, 1991 [DE] Fed. Rep. of Germany ....... 4101286

[51] Int. Cl.$^5$ ............................................. B60R 21/16
[52] U.S. Cl. ................................................ 280/743 R
[58] Field of Search .............. 280/743, 728, 730, 732, 280/731, 739

[56] References Cited

U.S. PATENT DOCUMENTS

| 3,451,693 | 6/1969 | Carey. | |
|---|---|---|---|
| 3,527,475 | 9/1970 | Carey et al. . | |
| 3,797,855 | 3/1974 | Wright, Jr. | 280/743 |
| 3,810,654 | 5/1974 | DeBano, Jr. et al. . | |
| 3,990,726 | 11/1976 | Oka et al. | 280/734 |
| 4,186,941 | 2/1980 | Scholz et al. | 280/743 |
| 5,048,863 | 9/1991 | Henseler et al. . | |

FOREIGN PATENT DOCUMENTS

| 2030863 | 12/1971 | Fed. Rep. of Germany ...... 280/743 |
| 2944319 | 5/1981 | Fed. Rep. of Germany ...... 280/743 |
| 3818185 | 8/1989 | Fed. Rep. of Germany . |
| 2184285 | 11/1973 | France . |

Primary Examiner—Karin L. Tyson
Attorney, Agent, or Firm—Tarolli, Sundheim & Covell

[57] ABSTRACT

An inflatable gas bag for restraining systems in vehicles consists of a jacket portion and two side portions sewn thereto. A fold is arranged on the one side portion. The fold is separated from the remaining part of the gas bag by a seam along a separating line extending transversely of the ejection direction. The seam is so dimensioned in its tearing strength that on reaching a predetermined value of the gas bag internal pressure the fold tears. By the fold the expansion direction of the gas bag can be controlled within a relatively wide range. At the same time in desired manner the ejection width and ejection velocity are reduced. Finally, the fold also controls a relief opening which is formed in one of the superimposed wall portions of the fold.

4 Claims, 2 Drawing Sheets

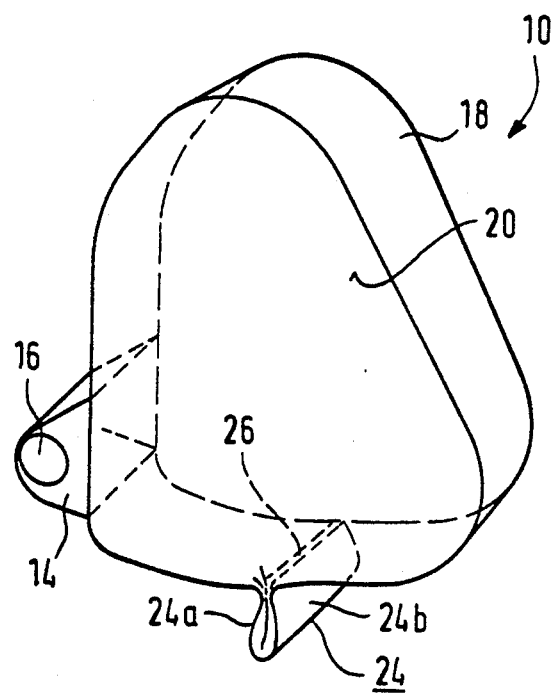
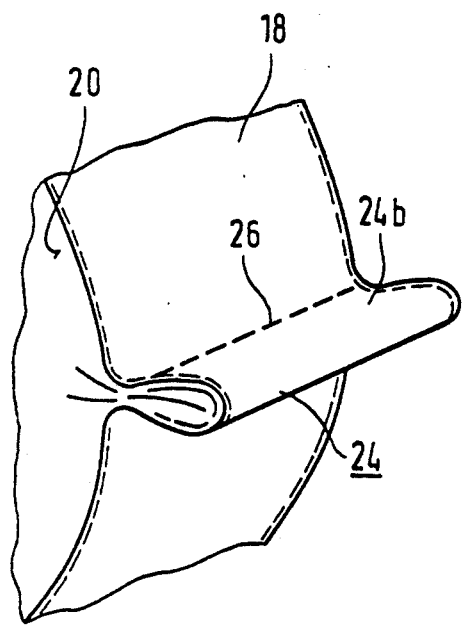
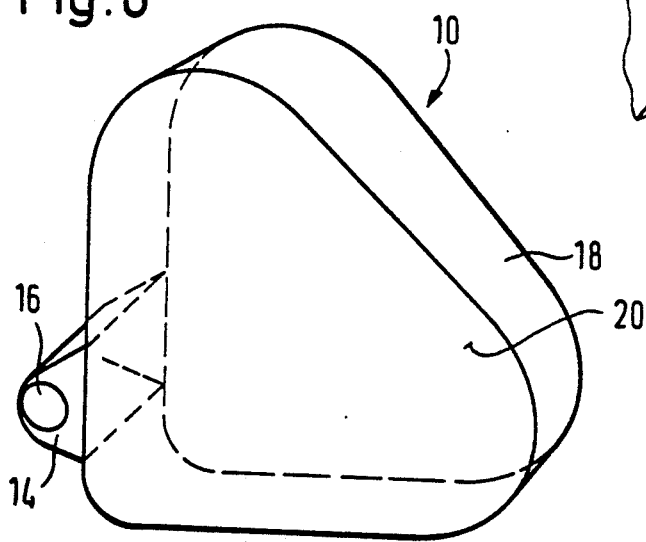

INFLATABLE GAS BAG FOR RESTRAINING SYSTEMS IN VEHICLES

BACKGROUND OF THE INVENTION

The invention relates to an inflatable gas bag for restraining systems in vehicles. In a vehicle collision such a gas bag is inflated within a few milliseconds and serves to protect the vehicle occupant as impact protective cushion. For optimum protection of the vehicle occupant the ejection direction of the gas bag on unfolding should be directed substantially to the centre of the sitting position so that the occupant penetrates centrally into the impact protective cushion. Depending on the vehicle type, it may be necessary to make the shape of the gas bag asymmetrical in the completely inflated state. The deviation of the ejection direction on unfolding of the gas bag from the ideal ejection direction pointing to the centre of the sitting position due to asymmetry of the gas bag can fundamentally be compensated by a suitable installation position of the entire gas bag restraining system in the vehicle. However, the configuration of the vehicle interior permits only limited changes of the orientation of the gas bag restraining system.

SUMMARY OF THE INVENTION

The present invention provides an inflatable gas bag for restraining systems wherein the ejection direction of the gas bag on unfolding can be optimized as required with simple means to correspond to the interior configuration of the vehicle in order to ensure a central penetration of the occupant into the inflated gas bag.

This is achieved according to the invention in that in the wall of the gas bag at least one fold is formed by holding two superimposed wall portions together in engagement with each other along a separating line separating the interior of the gas bag from the interior of the fold by holding means and that the holding means are so dimensioned in their strength that on reaching a predetermined value of the gas bag internal pressure the fold tears. The ejection direction of the gas bag on unfolding may be controlled within a relatively wide range by the arrangement and dimensioning of the fold or plurality of folds. A further desired effect resides in that both the expansion length and the expansion rate of the gas bag are reduced. As long as the fold has not torn, it reduces the peripheral length of the gas bag and consequently the maximum possible expansion distance in the ejection direction. Once the gas bag has been inflated to a predetermined internal pressure and the fold tears the further expansion takes place predominantly transversely of the ejection direction. The additional expansion in the ejection direction takes place with reduced velocity compared with the original ejection operation.

Depending on the desired influencing of the ejection direction one or more folds are arranged in at least one side portion and/or peripheral portion of the gas bag.

According to an advantageous further development of the invention in at least one of the superimposed wall portions of the fold at least one relief opening is formed. Until the fold tears the path of the gases from the interior of the gas bag to the relief opening is blocked. It is fundamentally already known to make the gas bag partially gas-permeable either by using a gas-permeable fabric or by forming relief openings in the wall of the gas bag. The controlled discharge of the gases from the gas bag is intended to optimize the energy absorption capacity in order to dampen the impact of the occupant on the gas bag. Since discharge of the gases through the wall of the gas bag occurs even in the initial phase of the restraining operation with the gas bag completely inflated, i.e. at an instant when energy absorption by the gas bag is not yet necessary, on the contrary as hard a gas bag as possible being desired because damping of the impact is achieved by the vehicle upsetting itself, the gases furnished by the gas generator are not used in optimum manner. However, in the preferred embodiment of the gas bag according to the invention the relief opening is closed in the initial phase of the restraining operation until a predetermined gas bag internal pressure is reached. The relief opening is not freed by tearing of the fold until an instant is reached at which a damping effect by energy absorption in the gas bag is desired.

BRIEF DESCRIPTION OF THE DRAWINGS

Further features and advantages of the invention will be apparent from the following description of several examples of embodiment and from the drawings to which reference is made and in which:

FIGS. 4 to 6 are analogous views of another embodiment of the gas bag.

DESCRIPTION OF THE PREFERRED EMBODIMENTS

Figure 1:
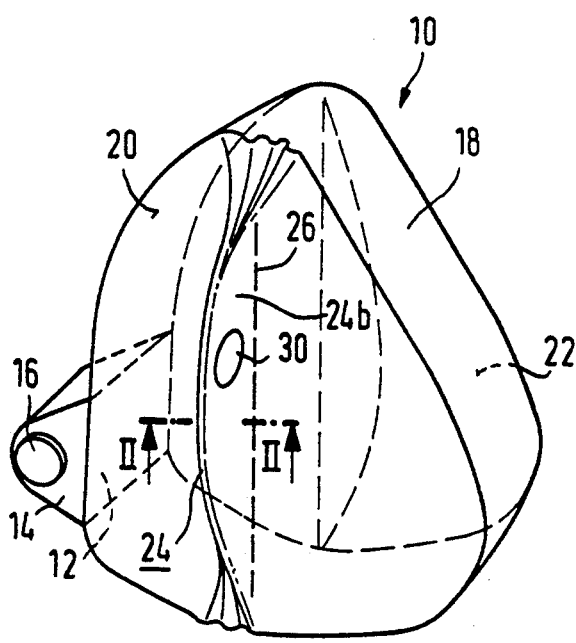
FIG. 1 is a schematic perspective view of an almost completely inflated gas bag.

The gas bag 10 of a restraining system for vehicles shown schematically in FIG. 1 in the almost completely inflated state is connected with its mouth 12 to the housing 14 of a gas generator 16. The gas bag 10 consists of a centre jacket portion 18 and two side portions 20, 22. Formed on the side portion 20 is a fold 24 which extends over almost the entire height of the gels bag. Said fold 24 consists of two superimposed wall portions 24a, 24b. The fold 24 is formed by holding the superimposed wall portions 24a, 24b in engagement with each other along a separating line separating the interior of the gas bag from the interior of the fold. In the embodiment shown along the separating line 26 a seam is disposed which may be a single or multiple seam in quilt, warp or zig-zag configuration. This seam has an exactly defined tearing strength adapted to the desired behaviour of the gas bag. This suitable dimensioning of the tearing strength of the seam running along the separating line 26 means that the fold 24 remains closed up to a predetermined value of the gas bag internal pressure. In the wall portion 24b of the fold 24 a relief opening 30 is formed. The relief opening 30 has no effect as long as the fold 24 is closed because the gases in the interior of the gas bag 10 are prevented from entering the relief opening 30 for as long as the interior of the fold 24 is separated from the interior of the gas bag by the seam along the separating line 26.

On activation of the gas generator 16 the gas bag is ejected out of the housing 14 and starts unfolding. In the almost completely unfolded state it has the configuration shown in FIG. 1. The fold 24 remains closed until the gas bag internal pressure has reached a predetermined value. On a further pressure rise in the interior of the gas bag the seam tears along the separating line 26 so that the fold 24 is open. At the same time, access to the relief opening 30 is also freed for the gases from the gas bag. The gas bag is now completely unfolded and assumes substantially the configuration shown in FIG. 3. As long as it remains closed the fold 24 on the side of the side portion 20 shortens the expansion of said side portion in the emergence direction of the gas bag. If no identical fold is provided in the opposite side portion 22 the expansion direction of the gas bag will swing towards the side of the fold 24. It has been found that by means of such a fold a change of the expansion direction of the gas bag by an angle of up to about 30° can be achieved. This value suffices in order to correct the expansion direction of the gas bag even under unfavourable insulation conditions so that it points substantially to the centre of the sitting position (assuming that the vehicle seat is disposed in the centre position of the longitudinal displacement travel). The fold 24 results also in a shortening of the entire emergence distance of the gas bag because for as long as it is closed said fold diminishes the peripheral length of the gas bag. In the subsequent unfolding of the gas bag into the state shown in FIG. 3 after the seam along the separating line 26 has torn only a slight further forward displacement of the gas bag takes place because the expansion is then predominantly transversely of the emergence direction. It is thus apparent that by the fold 24 the emergence velocity of the gas bag in the end phase of its unfolding is also reduced. Apart from the primarily desired effect of being able to control the ejection direction of the gas bag within a wide range, the fold 24 thus has two further very desirable effects, i.e. reduction of the ejection distance and a reduction of the axial ejection velocity of the gas bag.

A fourth very important effect resides in that the relief opening 30 is controlled by the state of the fold 24. It remains closed as long as said fold 24 is closed. Consequently, no gases are lost until almost complete unfolding of the gas bag. The gas bag has the desired great hardness in the initial phase of the restraining operation. It is only after opening of the fold 24 and complete unfolding of the gas bag that the relief opening 30 is freed. In this phase of the restraining operation the upsetting travel of the vehicle can be used up so that energy absorption diminishing the impact is possible then only by the gas bag. This energy absorption is achieved by controlled discharge of the gases from the gas bag through the relief opening 30.

Figure 2:
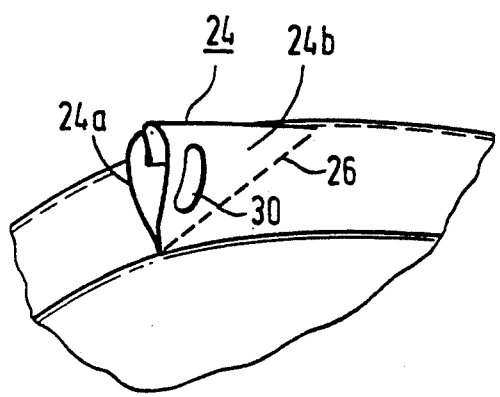
FIG. 2 is an enlarged detail view of the gas bag shown in FIG. 1 in section along the line II—II of FIG. 1.
Figure 3:
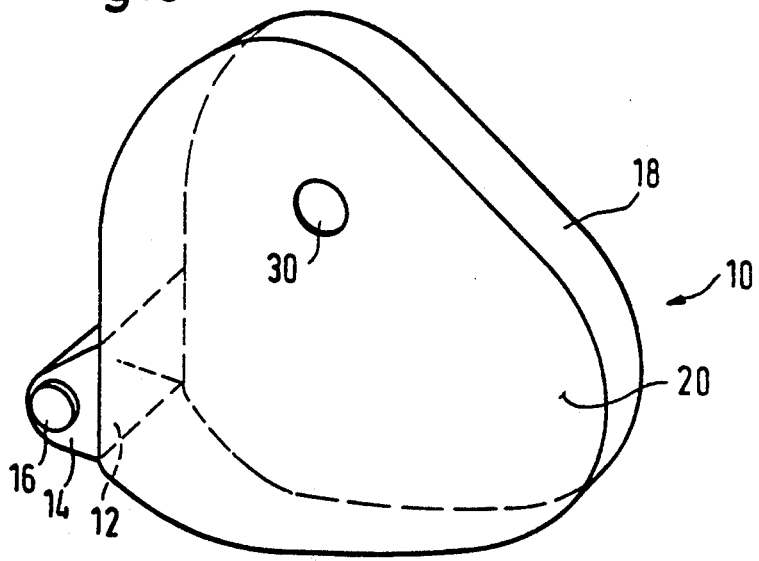
FIG. 3 is a schematic perspective view of the gas bag shown in FIG. 1 in the completely inflated state.

The embodiment according to FIGS. 4 to 6 differs essentially from that according to FIGS. 1 to 3 in that the fold 24 is not arranged in the side portion but in the jacket portion 18. Since furthermore the fold 24 is arranged in the lower section of the jacket portion 18 it effects a deflection of the expansion direction of the gas bag downwardly. A relief opening is not shown in this embodiment but can be provided if required. The fold 24 extends over the entire width of the jacket portion 18. In this embodiment as well the superimposed wall portions 24a, 24b of the fold 24 are joined along a separating line 26 by a seam.

In a further embodiment not shown in the drawings the superimposed wall portions of the fold are adhered together or bonded together by other suitable holding means, the important point being only that said holding means are dimensioned in their strength so that the fold tears when a predetermined value of the gas bag internal pressure is reached.

We claim:

1. An inflatable gas bag for restraining systems in a vehicle having an interior enclosed by a wall, said wall comprising a jacket portion and two side portions sewn thereto, a gas inlet in said jacket portion, said jacket portion including a lower section extending in a generally flat condition from said gas inlet, a generally straight section extending upwardly from said gas inlet, and an arched section extending from said upwardly extending section to said lower section when said gas bag is in a completely inflated state, a fold only in one of said side portions comprising two superimposed wall portions held together in engagement with each other along a separating line separating the interior of said gas bag from a volume defined by said fold, said superimposed wall portions being held together by a holding means and said holding means being so dimensioned in strength that on reaching a predetermined value of gas bag internal pressure said holding means releases said fold, said wall having an asymmetrical form in the completely inflated state, and said fold being disposed in said one side portion in a position and orientation to control the direction of expansion of said gas bag such that said gas bag tends to be unfolded upon inflation in a first direction centrally towards a vehicle occupant while the internal pressure of said gas bag is below the predetermined value and expanding in a second direction transverse to the first direction when the gas bag internal pressure exceeds the predetermined value and said holding means releases said fold.

2. The gas bag according to claim 1, wherein said holding means is formed by at least one seam arranged along said separating line.

3. The gas bag according to claim 1, wherein said holding means is formed by an adhesive connection.

4. The gas bag according to claim 1, wherein at least one of said superimposed wall portions of said fold is provided with at least one relief opening.

* * * * *